UNITED STATES PATENT OFFICE.

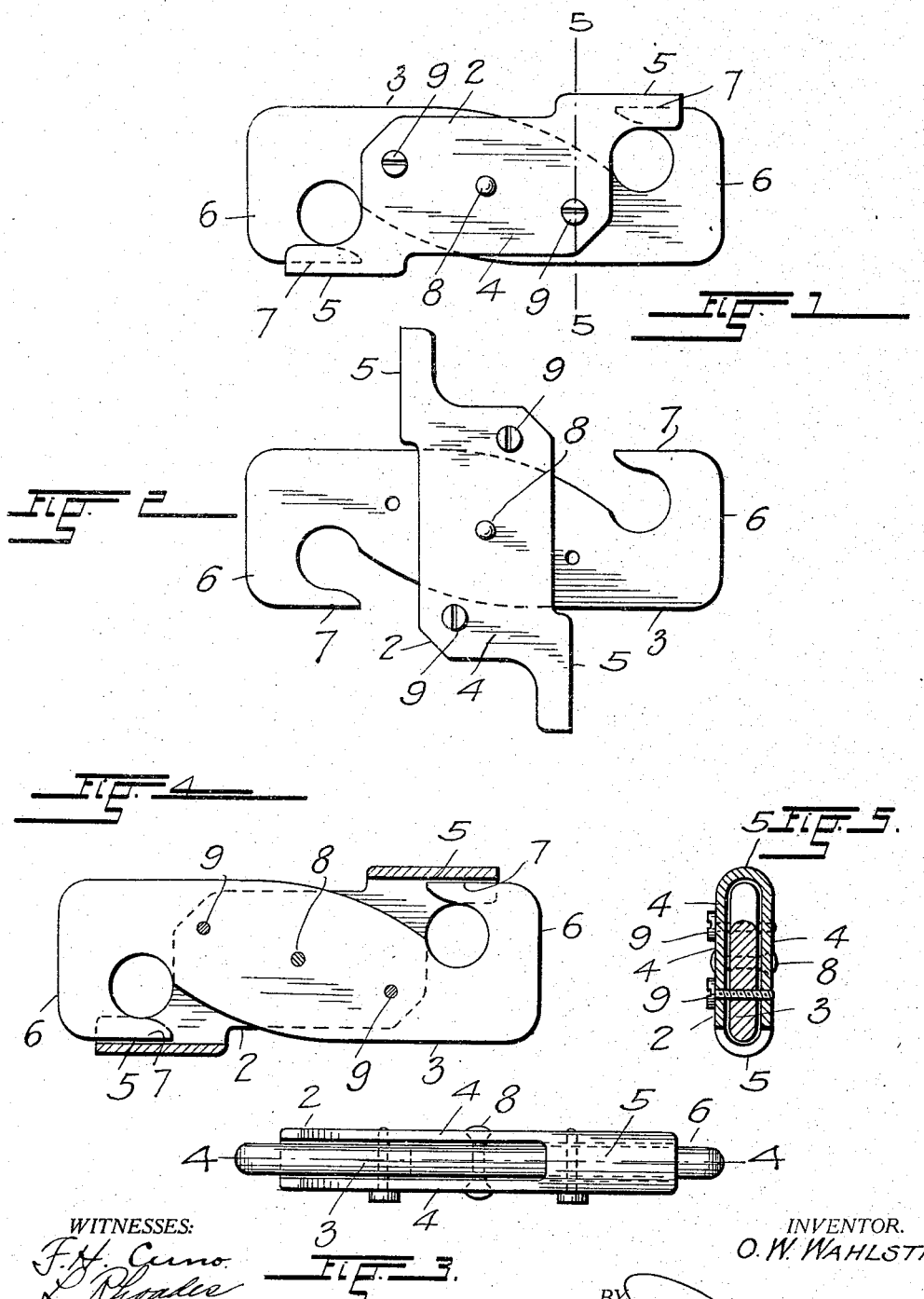

OSCAR W. WAHLSTROM, OF BOULDER, COLORADO.

CHAIN-LINK.

1,166,952.

Specification of Letters Patent. Patented Jan. 4, 1916.

Application filed April 14, 1915. Serial No. 21,324.

*To all whom it may concern:*

Be it known that I, OSCAR W. WAHLSTROM, a subject of Gustav V, King of Sweden, but having declared his intention of becoming a citizen of the United States, residing at Boulder, in the county of Boulder and State of Colorado, have invented certain new and useful Improvements in Chain-Links, of which the following is a specification.

This invention relates to improvements in chain links, and its object resides in providing a link of simple, strong, and economical construction which may be readily applied to unite the ends of broken chains.

An embodiment of my invention is illustrated in the accompanying drawings in the various views of which like parts are similarly designated, and in which, Figure 1 is a face view of my improved link, Fig. 2, a similar view of the link in its open condition, Fig. 3, an edge view of the link shown in Fig. 1, Fig. 4, a section taken along the line 4—4, Fig. 3, and Fig. 5, a transverse section along the line 5—5, Fig. 1.

Referring to the drawings, my improved link is composed of two coöperative members 2 and 3 which are connected to move relatively about a central pivot. The member 2 consists of a sheath composed of two side plates 4 which at diagonally opposite points are connected by integrally formed edge parts 5. The other member of the link consists of a bar formed to fit loosely within the sheath member and provided at its ends with reversedly curved hooks 6 the points 7 of which engage the inner surfaces of the edge parts of the same. The two members are pivotally connected by means of a riveted pin 8 and they are provided with registering threaded apertures for the application of screws 9 by means of which they are locked in their normal or closed relative positions.

From the foregoing description it will be seen that when the link members are in their closed position they present conjointly a link of very strong and durable construction which may be readily applied to the ends of a broken chain without the use of tools, other than a screw driver, and which therefore is particularly adapted for use in repairing broken chains such as those carried on automobile tires to prevent skidding of the wheels.

The engagement of the hook ends of the inner member 3 with the shoulders provided by the edge parts 5 of the sheath member, determines the relative positions of the members and gives to the link the solidity and rigidity required to withstand the strains to which a chain of which it forms part is subjected, and the width of the hooks 6 of the inner member, at their outer portions, is made sufficiently small to permit of two or more of the links being attached to each other to form part of a chain.

It will be understood that while the locking means of the character shown and described are preferable, set screws or other suitable devices may be employed to lock the two members against movement about their pivot.

Having thus described my invention what I claim and desire to secure by Letters-Patent is:

1. A chain-link comprising a sheath-member having interiorly shoulders at diagonally opposite points, a member pivoted at a central point within said sheath-member and having at its ends reversedly curved hooks the points of which engage said shoulders, and means for locking the two members against movement about their pivot.

2. A chain-link comprising a sheath member composed of side plates connected at diagonally opposite points by edge-parts, a member pivoted between said side-plates and having at its ends reversedly curved hooks the points of which engage said edge-parts, and a screw extending through an aperture in one of said side plates for locking the inner member against movement about its pivot.

3. A chain link comprising a sheath-member composed of side plates connected at diagonally opposite points by edge-parts, a member pivoted between said side-plates and having at its ends reversedly curved hooks the points of which engage said edge parts, the said inner member and one of the side plates of the sheath member having registering apertures, and a screw in said apertures for locking the inner member against movement about its pivot.

4. A chain link comprising a sheath member composed of spaced side plates connected only at diagonally opposite points, a member pivoted at a central point between the side plates and having at its ends reversedly curved hooks the outer edges of which normally engage the interior surfaces of the said connections of the plates, and means for locking the members against movement about their pivot.

5. A chain link comprising a sheath member composed of spaced side plates connected only at diagonally opposite points, the said connections being interiorly, substantially parallel to the longitudinal axis of the member, a member pivoted between the side plates and having at its ends reversedly curved hooks the outer edges of which normally engage along the inner surfaces of the said connections, and means for locking the members against movement about their pivot.

In testimony whereof I have affixed my signature in presence of two witnesses.

OSCAR W. WAHLSTROM.

Witnesses:
G. J. ROLLAUDET,
L. RHOADES,

Copies of this patent may be obtained for five cents each, by addressing the "Commissioner of Patents, Washington, D. C."